US008838832B1

(12) United States Patent
Thakur et al.

(10) Patent No.: US 8,838,832 B1
(45) Date of Patent: Sep. 16, 2014

(54) NETWORK ADDRESS CLUSTERING

(75) Inventors: Madhukar N. Thakur, San Jose, CA (US); Alon Altman, Mountain View, CA (US)

(73) Assignee: Google Inc., Mountain View, CA (US)

( * ) Notice: Subject to any disclaimer, the term of this patent is extended or adjusted under 35 U.S.C. 154(b) by 214 days.

(21) Appl. No.: 13/350,630

(22) Filed: Jan. 13, 2012

(51) Int. Cl.
*G06F 13/00* (2006.01)
*H04L 12/58* (2006.01)

(52) U.S. Cl.
CPC ..................................... *H04L 51/28* (2013.01)
USPC ........................... 709/245; 709/223; 709/224

(58) Field of Classification Search
CPC ....................................................... H04L 51/28
USPC ......................................... 709/245, 223, 224
See application file for complete search history.

(56) References Cited

U.S. PATENT DOCUMENTS 8,271,635 B2 * 9/2012 Harris, III ..................... 709/223
2010/0325213 A1 * 12/2010 Harris, III ..................... 709/206

* cited by examiner

*Primary Examiner* — Kenneth Coulter
(74) *Attorney, Agent, or Firm* — McDermott Will & Emery LLP

(57) ABSTRACT

The subject matter of this specification can be implemented in, among other things, a method for clustering network addresses that includes receiving data for one or more first network communications from a first network address and one or more second network communications from a second network address. The method further includes determining whether the first network communications and the second network communications include a first number of distinct identifiers in common. The method further includes associating the first network address and the second network address as a cluster based on determining that the first network communications and the second network communications include the first number of distinct identifiers in common.

15 Claims, 5 Drawing Sheets

NETWORK ADDRESS CLUSTERING

This instant specification relates to clustering network addresses.

BACKGROUND

Oftentimes a computer network address, such as an Internet Protocol (IP) address, is associated with a particular geographic location or area. For example, a set of IP addresses may be administered by a particular regional authority, such as the American Registry for Internet Numbers (ARIN), which administers IP addresses for one or more countries. The regional authority can allow an Internet Service Provider (ISP) to use the set of IP addresses for customers of the ISP, such as cable Internet or Digital Subscriber Line (DSL) users. The set of IP addresses from which the ISP assigns a specific IP address to a user's computing device can be associated with a particular geographic location or area, such as a neighborhood, city, state, or country.

An online business that provides a service, such as online banking or email, can detect possible fraud or abuse for an account by identifying an access of the account from a subsequent computing device with a different IP address. The online business determines that the different IP address is not within the set of IP addresses associated with the particular geographic location or area from which a user has previously accessed the account. The online business also determines that the different IP address originates from a location or area that is geographically distant from the location or area from which the user previously accessed the account. The online business then provides the subsequent computing device with an additional challenge question, such as a question regarding something only the user should know (e.g., a name of the user's first pet or an identifier generated by an identifier generating device in the user's possession). If the online business receives a correct response from the subsequent computing device, then the online business provides the computing device with access to the service.

SUMMARY

In one aspect, a computer-implemented method for clustering network addresses includes receiving data for one or more first network communications from a first network address and one or more second network communications from a second network address. The method further includes determining whether the first network communications and the second network communications include a first number of distinct identifiers in common. The method further includes associating the first network address and the second network address as a cluster based on determining that the first network communications and the second network communications include the first number of distinct identifiers in common.

Implementations can include any, all, or none of the following features. Each distinct identifier in the first number of distinct identifiers can have a first type. The method can further include receiving data for one or more third network communications from the first network address and one or more fourth network communications from the second network address. The method can further include determining whether the third network communications and the fourth network communications include a second number of distinct identifiers in common. Each distinct identifier in the second number of distinct identifiers can have a second type. Associating the first network address and the second network address as the cluster can be based on determining that the third network communications and the fourth network communications include the second number of distinct identifiers in common. The first type can be selected from a user identifier type, a stored identifier type, a session identifier type, and a device identifier type. The second type can be selected from the user identifier type, the stored identifier type, the session identifier type, and the device identifier type. The first type can be different than the second type. The method can further include receiving data for one or more additional network communications from the first network address, the second network address, and other network addresses. The method can further include generating a graph that includes nodes that represent each of the first network address, the second network address, and the other network addresses. The graph can include edges between pairs of the nodes in the graph. Each of the edges can represent one or more numbers of distinct identifiers that a pair of network addresses represented by the pair of nodes have in common. Each of the one or more numbers of distinct identifiers for each edge in the edges can have a different type of identifier. The method can further include associating the first network address, the second network address, and one or more of the other network addresses as the cluster based on analyzing the edges between the pairs of nodes in the graph. Analyzing the edges between the pairs of nodes in the graph can include applying a different weight to the first number of distinct identifiers of the first type than the second number of distinct identifiers of the second type. Analyzing the edges between the pairs of nodes in the graph can include performing one or more of a k-nearest neighbor algorithm, a support vector machine, and a hierarchical clustering algorithm on the edges between the pairs of nodes in the graph. Associating the first network address, the second network address, and one or more of the other network addresses as the cluster can be based on results of performing the one or more of the k-nearest neighbor algorithm, the support vector machine, and the hierarchical clustering algorithm. The method can further include providing, to a computing device, access to a service or a quality of service based on the computing device having a network address that is within the cluster. The method can further include receiving an authentication request for an account from the first network address. The method can further include determining whether the account has previously successfully responded to a security challenge a threshold percentage of times over a particular period of time from network addresses in the cluster. The method can further include providing the security challenge in response to determining that the account has not previously successfully responded to the security challenge the threshold percentage of times over the particular period of time from the network addresses in the cluster. The method can further include receiving a successful response to the security challenge from the first network address in response to providing the security challenge. The method can further include providing access to the account in response to receiving the successful response. The method can further include detecting abuse of the account from a network address within the cluster. The method can further include providing the security challenge for subsequent authentication requests from the cluster for the account in response to detecting the abuse.

In one aspect, a computer-implemented system for clustering network addresses includes an interface that receives data for one or more first network communications from a first network address and one or more second network communications from a second network address. The system further includes an identifier module that determines whether the first network communications and the second network communications include a first number of distinct identifiers in common. The system further includes a cluster module that associates the first network address and the second network address as a cluster based on determining that the first network communications and the second network communications include the first number of distinct identifiers in common. The system further includes a memory that stores the cluster.

Implementations can include any, all, or none of the following features. Each distinct identifier in the first number of distinct identifiers can have a first type. The interface can receive data for one or more third network communications from the first network address and one or more fourth network communications from the second network address. The identifier module can determine whether the third network communications and the fourth network communications include a second number of distinct identifiers in common. Each distinct identifier in the second number of distinct identifiers can have a second type. The cluster module can associate the first network address and the second network address as the cluster based on determining that the third network communications and the fourth network communications include the second number of distinct identifiers in common. The first type can be selected from a user identifier type, a stored identifier type, a session identifier type, and a device identifier type. The second type can be selected from the user identifier type, the stored identifier type, the session identifier type, and the device identifier type. The first type can be different than the second type. The interface can receive data for one or more additional network communications from the first network address, the second network address, and other network addresses. The identifier module can generate a graph that includes nodes that represent each of the first network address, the second network address, and the other network addresses. The graph can include edges between pairs of the nodes in the graph. Each of the edges can represent one or more numbers of distinct identifiers that a pair of network addresses represented by the pair of nodes have in common. Each of the one or more numbers of distinct identifiers for each edge in the edges can have a different type of identifier. The cluster module can associate the first network address, the second network address, and one or more of the other network addresses as the cluster based on analyzing the edges between the pairs of nodes in the graph. Analyzing the edges between the pairs of nodes in the graph can include applying a different weight to the first number of distinct identifiers of the first type than the second number of distinct identifiers of the second type. Analyzing the edges between the pairs of nodes in the graph can include performing one or more of a k-nearest neighbor algorithm, a support vector machine, and a hierarchical clustering algorithm on the edges between the pairs of nodes in the graph. The cluster module can associate the first network address, the second network address, and one or more of the other network addresses as the cluster based on results of performing the one or more of the k-nearest neighbor algorithm, the support vector machine, and the hierarchical clustering algorithm. The cluster module can provide, to a computing device, access to a service or a quality of service based on the computing device having a network address that is within the cluster. The system can include an access module that receives an authentication request for an account from the first network address. The access module can determine whether the account has previously successfully responded to a security challenge a threshold percentage of times over a particular period of time from network addresses in the cluster. The access module can provide the security challenge in response to determining that the account has not previously successfully responded to the security challenge the threshold percentage of times over the particular period of time from the network addresses in the cluster. The access module can receive a successful response to the security challenge from the first network address in response to providing the security challenge. The access module can provide access to the account in response to receiving the successful response. The access module can detect abuse of the account from a network address within the cluster. The access module can provide the security challenge for subsequent authentication requests from the cluster for the account in response to detecting the abuse.

The details of one or more implementations are set forth in the accompanying drawings and the description below. Other features and advantages will be apparent from the description and drawings, and from the claims.

DETAILED DESCRIPTION

This document describes systems and techniques for clustering network addresses, such Internet Protocol (IP) addresses. Many groups of network addresses are not associated with a particular geographic area. For example, IP addresses for services that provide anonymous Internet access, such as onion routing services, may be associated with many different computing devices in many different areas. In addition, network addresses for mobile computing devices, that connect to one or more wireless networks, may have many geographically distant locations. The systems and techniques described here cluster network addresses together by detecting shared identifiers being used by the network addresses. In some implementations, the network addresses are not associated with a particular geographic location.

Figure 1:
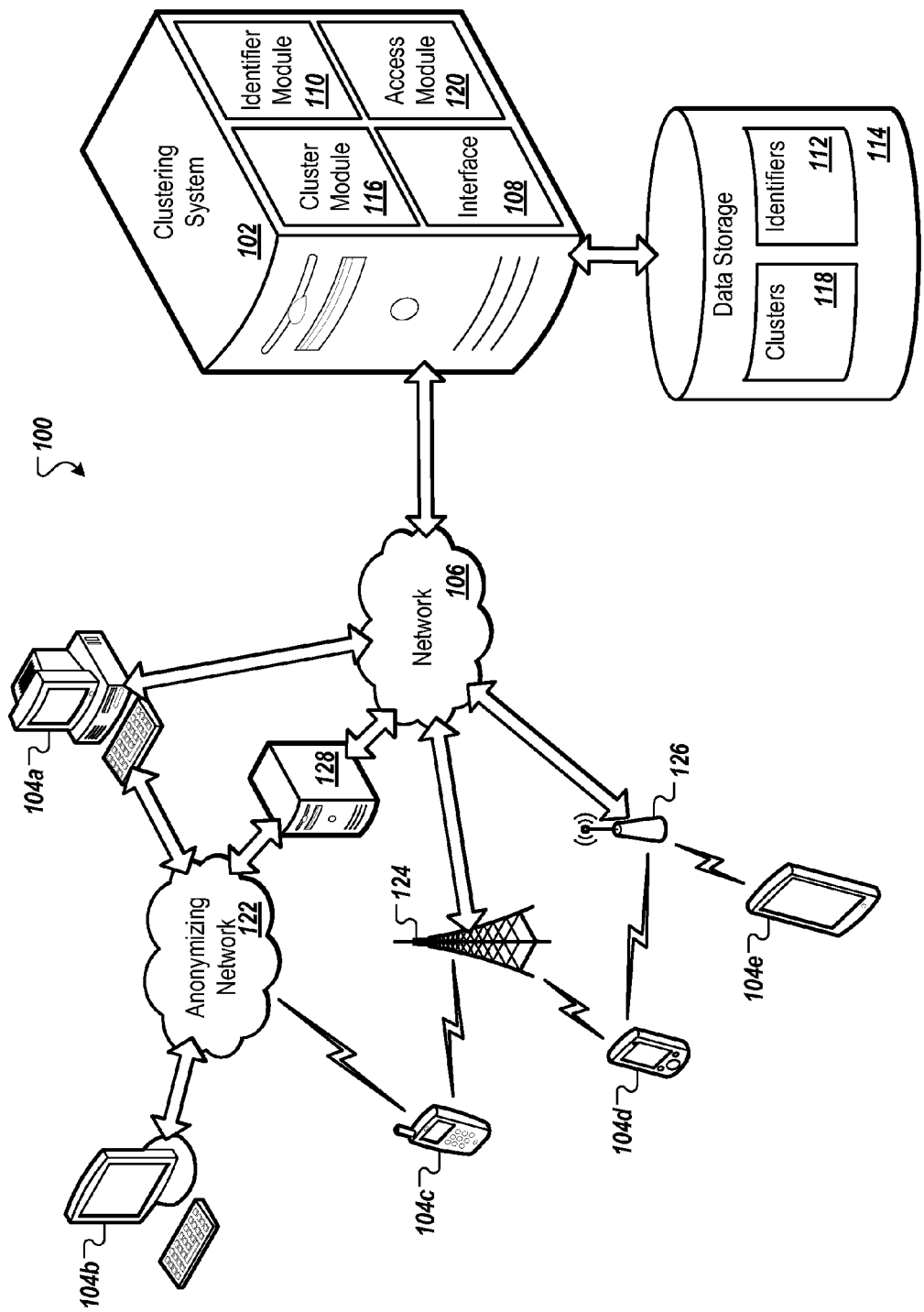
FIG. 1 is a schematic diagram that shows an example of a system for clustering network addresses.

FIG. 1 is a schematic diagram that shows an example of a system 100 for clustering network addresses. The system 100 includes a clustering system 102 that receives network communications from one or more computing devices 104a-e through a network 106. In particular, the clustering system 102 includes an interface 108 that receives the network communications from the network 106. Each of the network connections established by the computing devices 104a-e for sending the network communications has a network address. For example, each computing device that sends a network communication can have an IP address on the network 106.

The clustering system 102 also includes an identifier module 110. The identifier module 110 determines that the network communications include one or more identifiers 112. For example, the identifier module 110 can determine that a first network communication from a first network address of the computing device 104b and a second network communication from a second network address of the computing device 104c each include a first identifier. In some implementations, the identifier module 110 receives additional network communications for the first network address and the second network address that include additional identifiers in common. The clustering system 102 can store the identifiers 112 in a data storage 114. In another example, the identifier module 110 can determine that two different network communications with different network addresses from the same computing device have a same identifier.

The identifiers 112 can include one or more different types of identifiers. For example, the identifiers 112 can include an identifier of a user or an account that is provided in a form field of a web page (e.g., account identifiers such as "first.user@example.com" and "second.user@example.org"). In another example of a type of identifier, the identifiers 112 can include an identifier stored in a cookie from a browser application. In addition, the identifiers 112 can include an identifier of a hardware device, such as an identifier of a smartphone, an identifier of a subscriber identity module (SIM) card, an identifier of a hard disk drive, an identifier of a processing unit, and/or a Media Access Control (MAC) address of a network interface. In yet another example, the identifiers 112 can include an identifier from a referrer header for a web page. A referrer header of a current web page can include metadata that describes a previous web page from which a user navigated in getting to the current web page. The referrer header can include a web address of the previous web page, such as a Uniform Resource Locator (URL). The web address of the previous web page in the referrer header can then include an identifier.

In some implementations, the clustering system 102 and/or browser applications at the computing devices 104a-e can provide an opt-out and/or opt-in provision. For example, the clustering system 102 can provide a web page form in which a user can make an input indicating an opting out and/or opting in for providing one or more of the different types of identifiers. In another example, a browser application can provide a configuration option in which a user can make an input indicating an opting out and/or an opting in for providing one or more of the different types of identifiers.

The clustering system 102 also includes a cluster module 116 that uses the identifiers 112 to identify one or more clusters 118 of the network addresses. For example, if the cluster module 116 determines that the first identifier was included in both the first network communication from the first network address and the second network communication from the second network address, then the cluster module 116 can identify the first network address and the second network address as a cluster. In some implementations, the cluster represents a physical group or association of computing devices, such as computing devices that participate in an anonymizing network 122, a mobile device network 124, and/or or a wireless local area network 126.

The cluster module 116 can use multiple conditions and/or factors to identify clusters of network addresses, such as a threshold number of co-occurrences of an identifier in common between network addresses, a threshold number of distinct identifiers in common between network addresses, and/ or a threshold number of occurrences and/or distinct identifiers of a particular type in common between network addresses. In some implementations, the cluster module 116 can use an algorithm or calculation that applies a different weight to numbers of occurrences and/or distinct identifiers of a first type than is applied to numbers of occurrences and/or distinct identifiers of another type. The cluster module 116 can then combine the weighted numbers of occurrences and/ or distinct identifiers for multiple types of identifiers to generate an overall value.

The cluster module 116 can then compare the overall value to a threshold value (or to overall values calculated for other pairs or sets of network addresses) to determine whether or not a pair or set of multiple network addresses represent a cluster. In another example, the cluster module 116 can compare the overall value for a first pair or set of network addresses to overall values for other pairs or sets of network addresses to determine whether or not the first pair or set of multiple network addresses represent a cluster. The clustering system 102 can store the clusters 118 in the data storage 114.

The clustering system 102 can use the clusters 118 to detect or prevent fraud and abuse. For example, the clustering system 102 can include an access module 120 that receives an authentication request for an account from the computing device 104a. The access module 120 determines that requests for the account have typically been received from a first geographical location associated with a first network address of the computing device 104a on the network 106.

The access module 120 also determines that the current request is from a second network address, such as a network address previously identified as being included in the anonymizing network 122. The anonymizing network 122 hides the network address of the original sender, such as the computing device 104a, and instead reports a network address of a subsequent participant or a dedicated server for an exit node in the anonymizing network 122, such as the computing device 104b or one or more dedicated servers 128. The access module 120 determines that the second network address is associated with a second geographical location that is geographically distant (e.g., a greater distance than a person would typically travel between requests to access an account) from the first geographical location.

As a result of being geographically distant, the access module 120 can provide the computing device 104a (through one or more participants in the anonymizing network 122, such as the computing device 104b and/or the dedicated servers 128) with a challenge question. In some implementations, the challenge question is information that only the owner of the account knows, such as a maiden name of the owner's mother or a sequence of characters generated by a device in the owner's possession. If the access module 120 receives a correct response to the challenge question, then the access module 120 provides access to a service for the account.

For subsequent requests from network addresses within the cluster, the access module 120 can provide access to the service for the account without providing a challenge question again. In another example, the access module 120 can provide access to the service if the account has previously successfully responded to a security challenge a threshold percentage of times over a particular period of time from network addresses in the cluster (e.g., the anonymizing network 122). Otherwise, the access module 120 provides the security challenge in response to determining that the account has not previously successfully responded to the security challenge the threshold percentage of times over the particular period of time from the network addresses in the cluster.

In another example, of fraud and abuse detection or prevention, if the access module 120 identifies abusive behavior, such as exceeding a maximum number of login attempts or access of an account that has been reported or identified as being compromised, then the access module 120 can identify subsequent requests from the same cluster as likely to include abusive behavior. The access module 120 can then deny access to the service in response to the subsequent requests from the same cluster. Alternatively, the access module 120 can provide a challenge question in response to the subsequent requests from the same cluster after the abusive behavior is detected from a network address in the cluster. In some implementations, the access module 120 provides the challenge question after the abusive behavior is detected even if the account has previously successfully responded to a challenge question from a network address that is within the cluster.

In some implementations, the clustering system 102 can use the cluster 118 to determine a service or quality of service to provide to a computing device. For example, the cluster module 116 can provide a low bandwidth quality of service to the computing device 104d in response to determining that the computing device 104d is accessing the service from a network address that is within the cluster of network addresses for the mobile device network 124. Conversely, the cluster module 116 can provide a high bandwidth quality of service to the computing device 104d in response to determining that the computing device 104d is accessing the service from a network address that is within the cluster of network addresses for the wireless local area network 126. A low bandwidth quality of service can include, for example, low resolution video or a text advertisement and a high bandwidth quality service can include high resolution video or a video advertisement.

In another example of determining a service or quality of service to provide, the clustering system 102 can use the cluster 118 to identify a whitelist of authorized network addresses. The access module 120 can use then provide access to a service without first requiring successful completion of a security measure, such as a Completely Automated Public Turing test to tell Computers and Humans Apart (CAPTCHA). In another example, the clustering system 102 can provide a larger quota of actions in a service, such as a larger number of emails per day, for network addresses in whitelisted clusters as opposed to network addresses that are not in a whitelisted cluster. In yet another example, the clustering system 102 can provide a higher level of access to a service, such as write access for comments on blogs, for network addresses in whitelisted clusters as opposed to network addresses that are not in a whitelisted cluster, which may have read-only access to the blog comments.

The cluster module 116 can also identify other types of clusters in addition to the anonymizing network 122, such as the computing devices 104c-d in the mobile device network 124 or the computing devices 104d-e in the wireless local area network 126. In some implementations, the cluster module 116 can weight each identifier and network address relationship based on the type of the identifier. For example, the cluster module 116 can assign a higher weight to identifiers in logins than to identifiers from cookies. In some implementations, the cluster module 116 can use an algorithm, such as a support vector machine (SVM), hierarchical clustering, and/or a k-nearest neighbor algorithm to form a cluster of network addresses.

Figure 2:
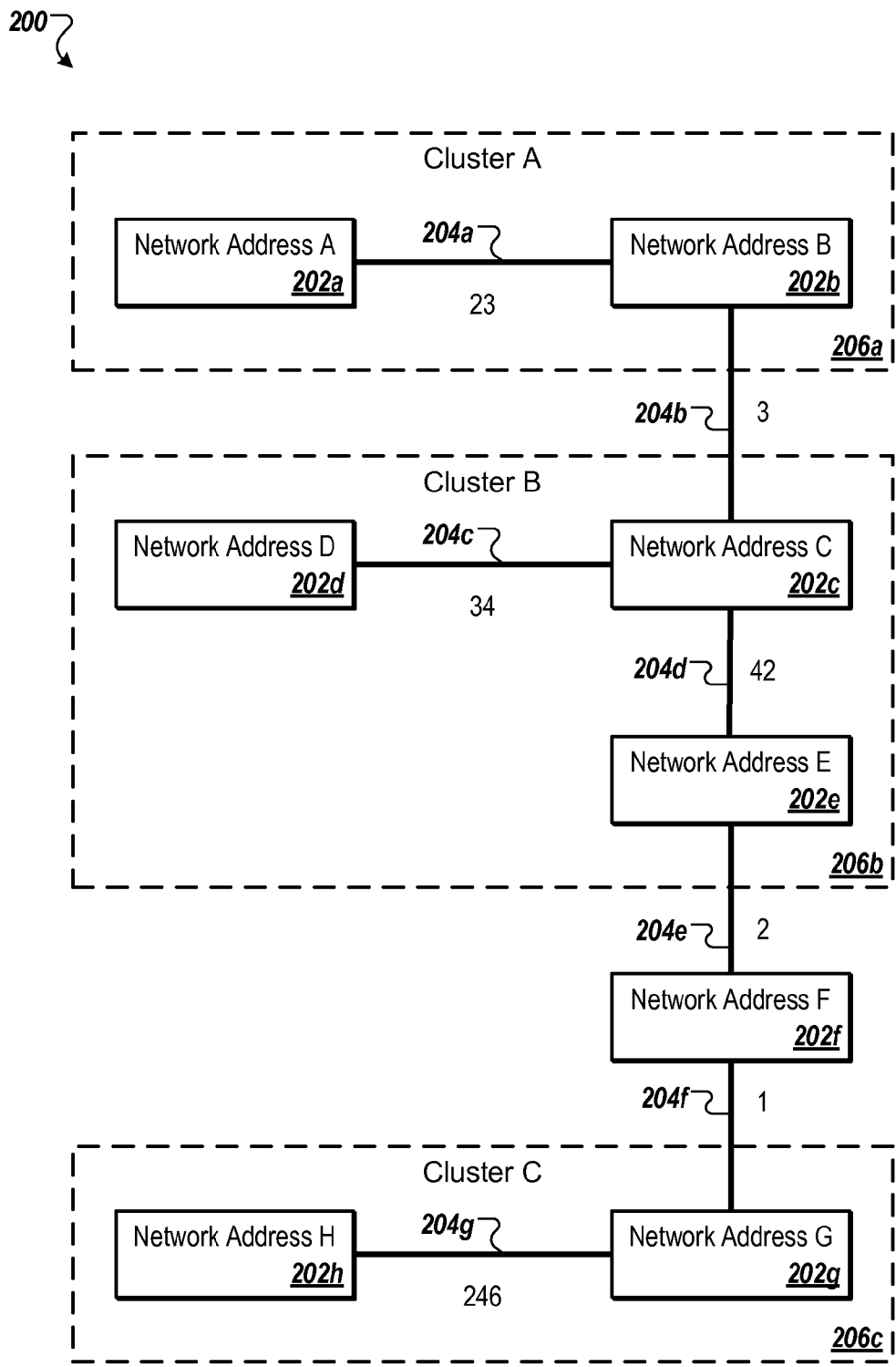
FIG. 2 shows an example of an undirected graph for clustering network addresses.

FIG. 2 shows an example of an undirected graph 200 for clustering multiple network addresses 202a-h. The undirected graph 200 includes multiple edges 204a-g between the network addresses 202a-h. The edges 204a-g represent numbers of identifiers that the network addresses 202a-h have in common. For example, the identifier module 110 can determine that the network address 202a and the network address 202b have thirty-four identifiers in common. In some implementations, the thirty-four identifiers can include multiple instances of the same identifier. In some implementations, the thirty-four identifiers can include instances of distinct identifiers. The thirty-four identifiers can also include multiple different types of identifiers, such as user or account identifier (e.g., an email address), an identifier from a cookie (e.g., hashed information), and a hardware identifier (e.g., a mobile device identifier).

Distinct identifiers are instances of different identifiers, such as at least one instance of the identifier "first.user@example.com" and at least one instance of "second.user@example.org." In some implementations, the identifier module 110 determines that the network communications from a pair of network addresses include a threshold number of instances of a particular identifier, such as at least ten instances of "first.user@example.com," before including "first.user@example.com" in the number of distinct identifiers that the pair of network addresses have in common.

In addition, the identifier module 110 and/or the cluster module 116 can apply different weights to numbers of distinct identifiers of different types, such as two instances of account identifiers (e.g., "first.user@example.com" and "second.user@example.org") and four instances of hardware identifiers (e.g., four different MAC addresses). For example, the identifier module 110 and/or the cluster module 116 the two instances of account identifiers can be left as is and the four instances of hardware identifiers can be multiplied by two. The identifier module 110 and/or the cluster module 116 can then combine the results, such as by adding the results of two and eight, to calculate an overall value of ten for the distinct identifiers that the pair of network addresses have in common.

The cluster module 116 evaluates the edges 204a-g to identify one or more clusters 206a-c in which one or more pairs of the network addresses 202a-h meet a threshold for clustering. The threshold can include, for example, a minimum number of instances of identifiers that a pair have in common and/or a minimum number of distinct identifiers that the pair have in common. The threshold can, in another example, include a minimum value for the combined weighted value of instances of identifiers and/or distinct identifiers that a pair have in common.

In one example of a threshold, the cluster module 116 can identify network addresses with an edge indicating twenty or more instances of identifiers and/or distinct identifiers in common as a cluster. Accordingly, the cluster module 116 identifies the network address 202a and the network address 202b as the cluster 206a because the edge 204a represents a number of identifier instances and/or distinct identifiers that is equal to or greater than twenty. The cluster module 116 does not include the network address 202c in the cluster 206a because the edge 204 represents a number of identifier instances and/or distinct identifiers that is less than the threshold of twenty.

The cluster module 116 can identify more than two network addresses as belonging to the same cluster. For example, the cluster module 116 can identify the network address 202c and the network address 202d as belonging to the cluster 206b because the edge 204c represents a number of identifier instances and/or distinct identifiers that is equal to or greater than twenty. In addition, the cluster module 116 also includes the network address 202e in the cluster 206b because the edge 204d (to the network address 202c that is already in the cluster 206c) also represents a number of identifier instances and/or distinct identifiers that is equal to or greater than twenty. In some implementations, the undirected graph 200 may also include an edge between the network address 202d and the network address 202e that represents less than twenty identifier instances and/or distinct identifiers, and the cluster module 116 can still include the network address 202e in the cluster 206b based on the edge 204d.

The undirected graph 200 can include one or more network addresses that are not included in a cluster. For example, the cluster module 116 can determine that the edge 204e and the edge 204f to the network address 202f are both represent less than twenty identifier instances and/or distinct identifiers. As a result, the cluster module 116 does not include the network address 202f in the cluster 206b or the cluster 206c. The cluster module 116 can still identify the network address 202g and the network address 202h as belonging to the cluster 206c based on the edge 204g.

In some implementations, the identifier module 110 can weight a contribution from one type of identifier by a different amount than another type of identifier. For example, the identifier module 110 can weight cookie identifiers and hardware identifiers twice as high as other identifiers. The edge 204a may have ten instances of cookie and hardware identifiers and three instances of other identifiers. In some implementations, the instances include distinct instances. In some implementations, the instances include repeated occurrences of the same identifier. The identifier module 110 doubles the contribution of the cookie and hardware identifiers to twenty and adds the contribution of the other identifier instances. As a result, the identifier module 110 calculates a total weighted number of identifier instances of twenty-three for the edge 204a.

Figure 3A:
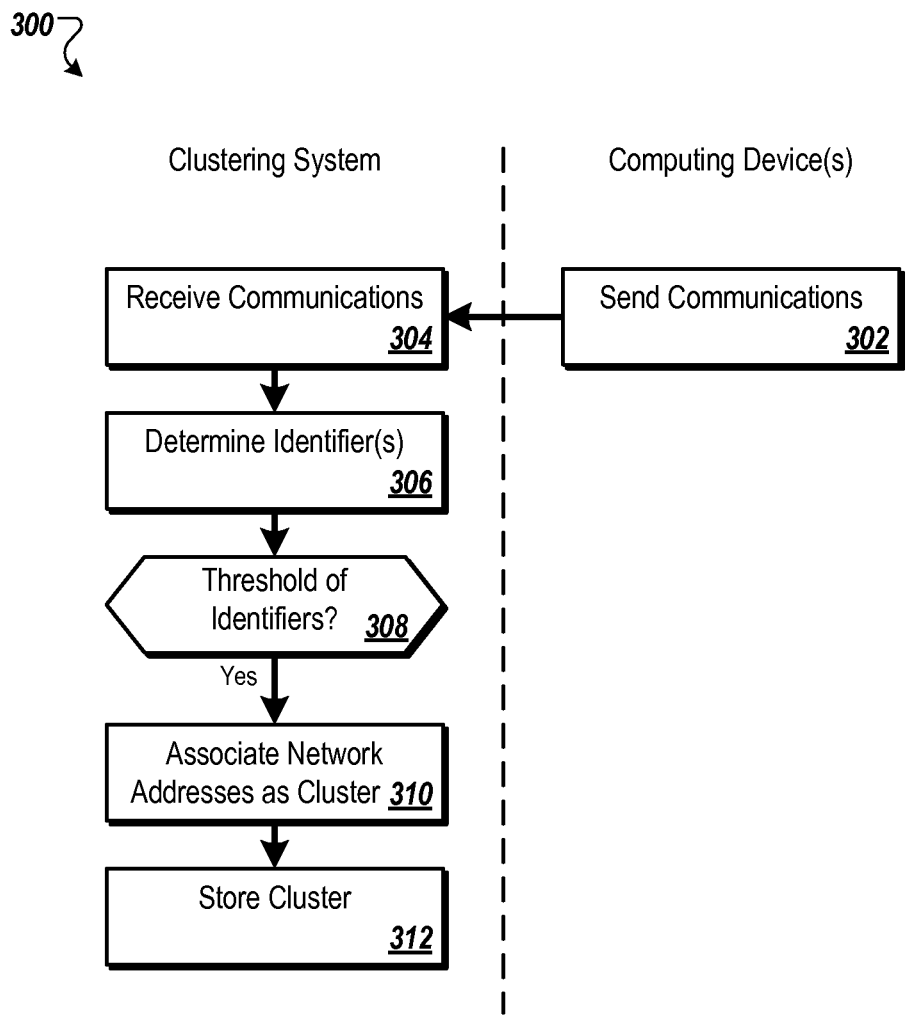
FIG. 3A is flow chart that shows an example of a process for clustering network addresses.

FIG. 3A is flow chart that shows an example of a process 300 for clustering network addresses. The process 300 may be performed, for example, by a system such as the system 100 and the undirected graph 200. For clarity of presentation, the description that follows uses the system 100 and the undirected graph 200 as examples for describing the process 300. However, another system, or combination of systems, may be used to perform the process 300. The process 300 begins, in step 302, with one or more computing devices sending network communications to a system, such as a clustering system. For example, the computing devices 104a-e can send communications to the clustering system 102 through one or more of the network 106, the anonymizing network 122, the mobile device network 124, and the wireless local area network 126.

In step 304, data for the communications is received, including at least one or more first network communications from a first network address and one or more second network communications from a second network address. Then, in step 306, it is determined whether the first network communications each include a first identifier and the second network communications each include the first identifier. The process 300 can also include determining that the first network communications and the second network communications include multiple instances of the first identifier and/or one or more instances of other identifiers. In some implementations, the process 300 can also include determining that additional network communications from other network addresses, together with the first and second communications from the first and second network addresses, include identifiers (repeated and/or distinct) in common with one another.

For example, the identifier module 110 can determine that a first network communication sent from a first network address on the anonymizing network 122, such as the network address of the computing device 104b, includes a particular identifier (e.g., a user login identifier). The identifier module 110 also determines that a second network communication sent from a second network address on the anonymizing network 122, such as the network address of the computing device 104c, also includes the particular identifier. In actuality, both the first and second network communications may have originated from the computing device 104a, but appear to be sent from the computing device 104b and the computing device 104c, respectively, due to the operation of the anonymizing network 122.

In another example, the identifier module 110 can determine that a first network communication sent from a first network address, such as the network address of the computing device 104d on the mobile device network 124, includes a particular identifier (e.g., a mobile device serial number identifier). The identifier module 110 also determines that a second network communication sent from a second network address, such as the network address of the computing device 104d on the wireless local area network 126, also includes the particular identifier.

In some implementations, in step 308, it is determined if the first network communications include at least a threshold of identifiers in common with the second network communications (and/or others of the network communications from the various network addresses). For example, the cluster module 116 can determine that a threshold number of occurrences of a particular identifier and/or a threshold number of distinct identifiers have occurred for the first network address. The cluster module 116 also determines that the threshold number of occurrences of the particular identifier and/or a threshold number of distinct identifiers have occurred for the second network address.

In some implementations, it is determined if another threshold or condition has been satisfied. For example, the cluster module 116 can determine that a threshold number of occurrences and/or distinct identifiers of a particular type are included in the network communications. Types of identifiers can include, for example, a user identifier type (e.g., a user login or account identifier), a stored identifier type (e.g., a cookie identifier), a session identifier type (e.g., a referrer header identifier or URL parameter), and a device identifier type (e.g., a hardware serial number). In another example, the cluster module 116 can determine that a calculation of a weighted number of identifiers and/or a weighted number of distinct identifiers is equal to or greater than a threshold value. In calculating weighted numbers of identifiers and/or distinct identifiers, the cluster module 116 can multiply numbers of identifiers and/or distinct identifiers for different identifier types by weighting factors that are specific to each type of identifier. For example, identifiers from cookies and hardware identifiers may have a higher reliability. Accordingly, the cluster module 116 can apply a higher weighting factor to cookie and hardware identifiers than, for example, identifiers from referrer headers and user logins.

In some implementations, the process 300 can use an algorithm instead of or in addition to testing one or more thresholds. For example, the cluster module 116 can represent the network addresses as nodes in a graph, such as the undirected graph 200, and numbers of identifiers and/or distinct identifiers as edges between the nodes of the graph. The cluster module 116 can then use an algorithm, such as a k-nearest neighbor algorithm, a support vector machine, or a hierarchical clustering algorithm, to cluster the network addresses based on the edges between the nodes in the graph.

If the first network communications and the second network communications both satisfy any thresholds or conditions for clustering, then, in step 310, the first network address and the second network address are clustered. The process 300 associates the first network address and the second network address as a cluster based on determining that the first network communications and the second network communications include one or more identifiers and/or distinct identifiers in common.

Finally, in step 312, the identified cluster is stored for later use. For example, the cluster module 116 can store the identified cluster in the data storage 114. The information stored for the stored cluster can include, for example, a list of the network addresses included in the cluster.

Figure 3B:
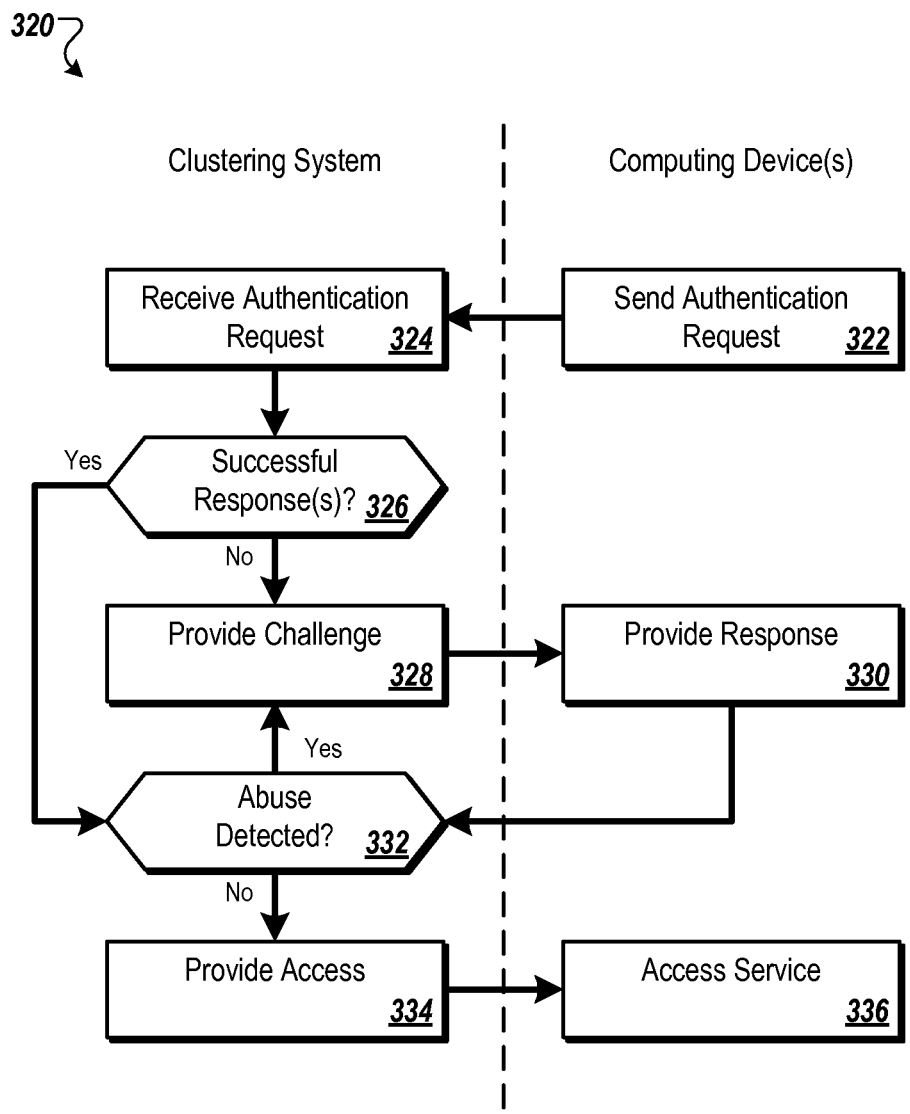
FIG. 3B is flow chart that shows an example of a process for using a cluster of network addresses.

FIG. 3B is flow chart that shows an example of a process 320 for using a cluster of network addresses. In step 322, the process 320 begins with a computing device sending an authentication request for an account from a first network address in a cluster of network addresses. In step 324, the authentication request for the account from the first network address is received. For example, the access module 120 can receive an authentication request from the computing device 104b, which has a first network address that is within a cluster of network addresses from the anonymizing network 122.

In step 326, it is determined whether the account has previously successfully responded to a security challenge a threshold percentage of times over a particular period of time from network addresses in the cluster. For example, the access module 120 may have received one or more successful responses to the security challenges for the account from network addresses in the cluster for the anonymizing network 122. However, the access module 120 may not have received successful responses in at least the threshold percentage of times (e.g., 60%, 80%, or 100%) over the particular period of time (e.g., the past hour, day, week, month, or year) from the network addresses in the cluster in response to the security challenges.

In step 328, the security challenge is provided in response to determining that the account has not previously successfully responded to the security challenge in at least the threshold percentage of times over the particular period of time. In step 330, the computing device provides a response to the security challenge. For example, the access module 120 can provide a security challenge that includes a request for information that only a user of the account knows, such as personal information or a temporary identifier generated by a device in the possession of the user.

If the successful response to the security challenge is received in response to providing the security challenge and if, in step 332, abuse is not detected, then, in step 334, access is provided to a service for the account in response to receiving the successful response. In step 336, the computing device accesses the service for the account. However, if, in step 332, abuse is detected, then, in step 328, the security challenge is provided again or access is denied to the service. Detecting abuse can include, for example, determining that a maximum number of attempts for authentication and/or the security challenge has been exceeded from other network addresses in the same cluster. Another example of detecting abuse includes accessing an account that has been reported as being compromised.

In step 322, a subsequent authentication request can be received for the account from a second network address that is also included in the cluster. In step 326, it is determined that the successful response has already been received by a network address from the cluster and, as a result, in step 332, access is provided to the service for the account without providing the security challenge.

For example, the access module 120 can receive a subsequent authentication request for the account from a network address of the computing device 104c. Again, the subsequent request may originate from the computing device 104a, but to the access module 120 the subsequent request appears to be sent from the network address of the computing device 104c due to the anonymizing network 122. The access module 120 accesses data for the clusters 118 in the data storage 114 to determine that the network address of the computing device 104c is included in the cluster from which the account previously provided the successful security challenge response.

In some implementations, the clustering system 102 can use the authentication requests and security challenge responses to identify network addresses for a clustering. For example, the access module 120 can provide the authentication request information (e.g., network address and login identifier) to the identifier module 110. The identifier module 110 extracts the network address and login identifier, such as the login identifier for the authentication requests that originated from the computing device 104a, but appeared to be sent form the computing device 104b and the computing device 104. The cluster module 116 can identify the network address of the computing device 104a as also being a member of the cluster for the anonymizing network 122 if the threshold number of identifiers exists for the network address of the computing device 104a (or other condition or algorithm). In some implementations, the identifiers that link the computing device 104a with the anonymizing network 122 can originate from the computing device 104a or another computing device in the anonymizing network 122.

Figure 4:
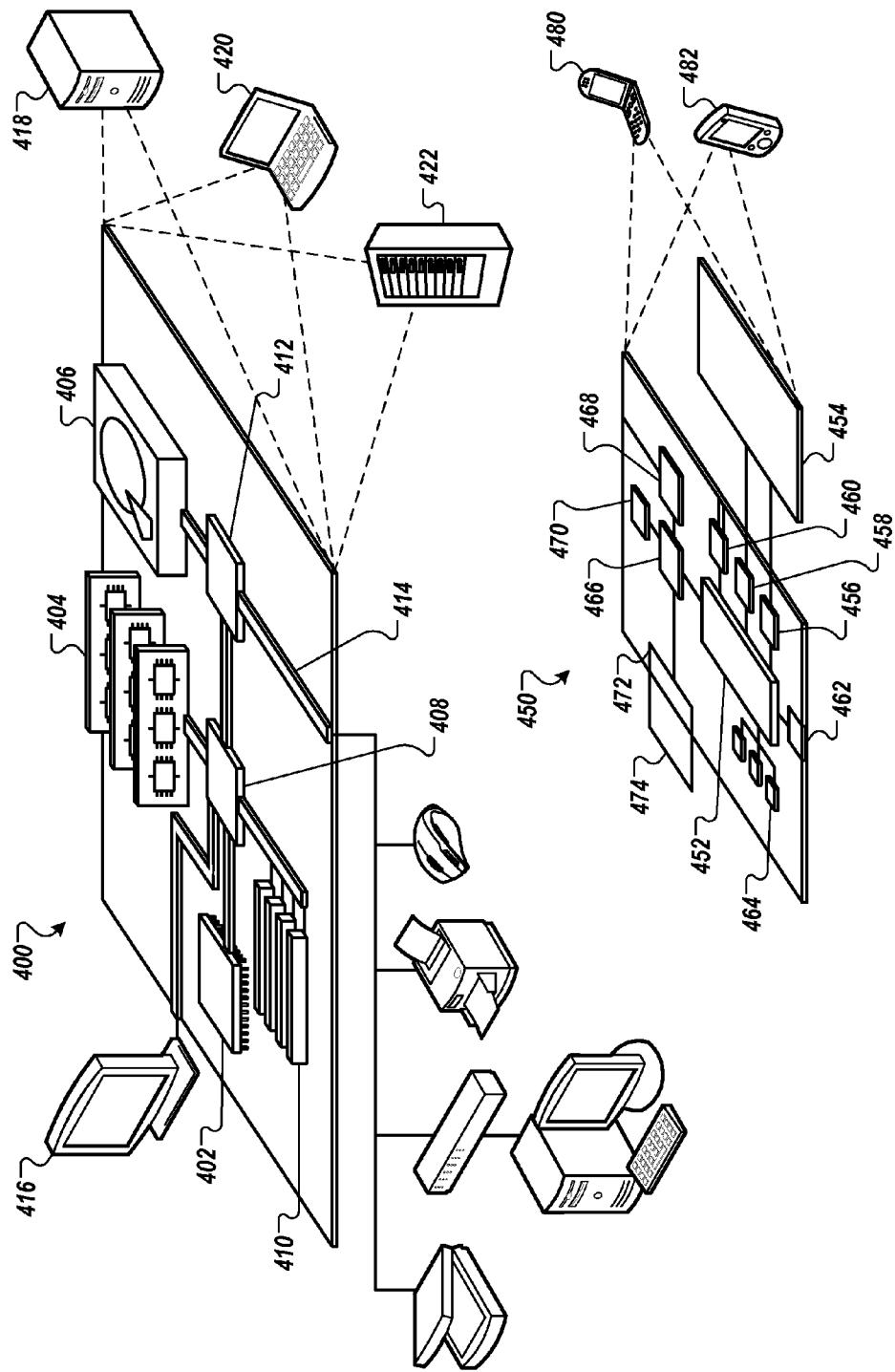
FIG. 4 is a schematic diagram that shows an example of a computing device and a mobile computing device.

FIG. 4 is a schematic diagram that shows an example of a computing device 400 and an example of a mobile computing device that can be used to implement the systems and techniques described here. The computing device 400 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations.

A computer program product can be tangibly embodied in an information carrier. The computer program product may contain instructions that, when executed, perform one or more methods, such as those described above. The computer program product can also be tangibly embodied in a computer- or machine-readable medium, such as the memory 404, the storage device 406, or memory on the processor 402.

The high-speed interface 408 manages bandwidth-intensive operations for the computing device 400, while the low-speed interface 412 manages lower bandwidth-intensive operations. Such allocation of functions is exemplary only. In some implementations, the high-speed interface 408 is coupled to the memory 404, the display 416 (e.g., through a graphics processor or accelerator), and to the high-speed expansion ports 410, which may accept various expansion cards (not shown). In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 418, or multiple times in a group of such servers. In addition, it may be implemented in a personal computer such as a laptop computer 420. It may also be implemented as part of a rack server system 422. Alternatively, components from the computing device 400 may be combined with other components in a mobile device (not shown), such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a microdrive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. The memory 464 may include, for example, flash memory and/or NVRAM memory (non-volatile random access memory).

An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provide as a security module for the mobile computing device 450, and may be programmed with instructions that permit secure use of the mobile computing device 450. In addition, secure applications may be provided via the SIMM cards, along with additional information, such as placing identifying information on the SIMM card in a secure manner.

In some implementations, a computer program product is tangibly embodied in an information carrier. The computer program product contains instructions that, when executed, perform one or more methods, such as those described above. The computer program product can be a computer- or machine-readable medium, such as the memory 464, the expansion memory 474, or memory on the processor 452. In some implementations, the computer program product can be received in a propagated signal, for example, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 468 using a radio-frequency. In addition, short-range communication may occur, such as using a Bluetooth, Wi-Fi, or other such transceiver (not shown). In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

For situations in which the systems discussed here use personal information about users, the users may be provided with an opportunity to opt in/out of programs or features that use personal information (e.g., information about a user's preferences, current location or previous location, search history, or search result selections). In addition, certain data may be made anonymous in one or more ways before it is stored or used, so that personally identifiable information is removed. For example, a user's identity may be made anonymous so that the no personally identifiable information can be determined for the user. In addition, a user's geographic location may be generalized where location information is obtained (such as to a city, zip code, or state level), so that a particular location of a user cannot be determined.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method for clustering network addresses, the method comprising:
   receiving data for one or more first network communications from a first network address and one or more second network communications from a second network address;
   determining, by one or more hardware processors, whether the first network communications and the second network communications include a first number of distinct identifiers in common;
   associating the first network address and the second network address as a cluster based on determining that the first network communications and the second network communications include the first number of distinct identifiers in common;
   receiving an authentication request for an account from the first network address;
   determining whether the account has previously successfully responded to a security challenge a threshold percentage of times over a particular period of time from network addresses in the cluster;
   providing the security challenge in response to determining that the account has not previously successfully responded to the security challenge the threshold percentage of times over the particular period of time from the network addresses in the cluster;
   receiving a successful response to the security challenge from the first network address in response to providing the security challenge; and
   providing access to the account in response to receiving the successful response.

2. The method of claim 1, wherein each distinct identifier in the first number of distinct identifiers has a first type, and wherein the method further comprises:

receiving data for one or more third network communications from the first network address and one or more fourth network communications from the second network address;

determining whether the third network communications and the fourth network communications include a second number of distinct identifiers in common, wherein each distinct identifier in the second number of distinct identifiers has a second type; and wherein associating the first network address and the second network address as the cluster is based on determining that the third network communications and the fourth network communications include the second number of distinct identifiers in common.

3. The method of claim 2, wherein the first type is selected from a user identifier type, a stored identifier type, a session identifier type, and a device identifier type;

wherein the second type is selected from the user identifier type, the stored identifier type, the session identifier type, and the device identifier type; and wherein the first type is different than the second type.

4. The method of claim 3, further comprising:

receiving data for one or more additional network communications from the first network address, the second network address, and other network addresses;

generating a graph that includes nodes that represent each of the first network address, the second network address, and the other network addresses, wherein the graph includes edges between pairs of the nodes in the graph, wherein each of the edges represents one or more numbers of distinct identifiers that a pair of network addresses represented by the pair of nodes have in common, and wherein each of the one or more numbers of distinct identifiers for each edge in the edges has a different type of identifier; and associating the first network address, the second network address, and one or more of the other network addresses as the cluster based on analyzing the edges between the pairs of nodes in the graph.

5. The method of claim 4, wherein analyzing the edges between the pairs of nodes in the graph comprises applying a different weight to the first number of distinct identifiers of the first type than the second number of distinct identifiers of the second type.

6. The method of claim 5, wherein analyzing the edges between the pairs of nodes in the graph comprises performing one or more of a k-nearest neighbor algorithm, a support vector machine, and a hierarchical clustering algorithm on the edges between the pairs of nodes in the graph; and wherein associating the first network address, the second network address, and one or more of the other network addresses as the cluster is based on results of performing the one or more of the k-nearest neighbor algorithm, the support vector machine, and the hierarchical clustering algorithm.

7. The method of claim 6, further comprising providing, to a computing device, access to a service or a quality of service based on the computing device having a network address that is within the cluster.

8. The method of claim 1, further comprising:

detecting abuse of the account from a network address within the cluster; and providing the security challenge for subsequent authentication requests from the cluster for the account in response to detecting the abuse.

9. A computer-implemented system for clustering network addresses, the system comprising:

an interface that receives data for one or more first and third network communications from a first network address and one or more second and fourth network communications from a second network address;

an identifier module that determines whether the first and second network communications include a first number of distinct identifiers in common, wherein each distinct identifier in the first number of distinct identifiers has a first type, and whether the third and fourth network communications include a second number of distinct identifiers in common, wherein each distinct identifier in the second number of distinct identifiers has a second type, and generates a graph that includes nodes that represent each of the first network address and the second network address, wherein the graph includes edges between pairs of the nodes in the graph, wherein each of the edges represents one or more numbers of distinct identifiers that a pair of network addresses represented by the pair of nodes have in common;

a cluster module that associates the first network address and the second network address as a cluster based on determining that the first and second network communications and the third and fourth network communications include the first and second number of distinct identifiers respectively in common, and based on analyzing the edges between the pairs of nodes in the graph, the analyzing comprising applying a different weight to the first number of distinct identifiers of the first type than the second number of distinct identifiers of the second type;

a memory that stores the cluster.

10. The system of claim 9, wherein the first type is selected from a user identifier type, a stored identifier type, a session identifier type, and a device identifier type;

wherein the second type is selected from the user identifier type, the stored identifier type, the session identifier type, and the device identifier type; and wherein the first type is different than the second type.

11. The system of claim 10, wherein the interface receives data for one or more additional network communications from the first network address, the second network address, and other network addresses;

wherein the identifier module generates a graph that includes nodes that represent each of the first network address, the second network address, and the other network addresses, wherein the graph includes edges between pairs of the nodes in the graph, wherein each of the edges represents one or more numbers of distinct identifiers that a pair of network addresses represented by the pair of nodes have in common, and wherein each of the one or more numbers of distinct identifiers for each edge in the edges has a different type of identifier; and wherein the cluster module associates the first network address, the second network address, and one or more of the other network addresses as the cluster based on analyzing the edges between the pairs of nodes in the graph.

12. The system of claim 10, further comprising an access module that receives an authentication request for an account from the first network address;

wherein the access module determines whether the account has previously successfully responded to a security challenge a threshold percentage of times over a particular period of time from network addresses in the cluster;

wherein the access module provides the security challenge in response to determining that the account has not previously successfully responded to the security challenge the threshold percentage of times over the particular period of time from the network addresses in the cluster;

wherein the access module receives a successful response to the security challenge from the first network address in response to providing the security challenge; and wherein the access module provides access to the account in response to receiving the successful response.

13. The system of claim 12, wherein the access module detects abuse of the account from a network address within the cluster; and wherein the access module provides the security challenge for subsequent authentication requests from the cluster for the account in response to detecting the abuse.

14. The system of claim 9, wherein analyzing the edges between the pairs of nodes in the graph comprises performing one or more of a k-nearest neighbor algorithm, a support vector machine, and a hierarchical clustering algorithm on the edges between the pairs of nodes in the graph; and wherein the cluster module associates the first network address, the second network address, and one or more of the other network addresses as the cluster based on results of performing the one or more of the k-nearest neighbor algorithm, the support vector machine, and the hierarchical clustering algorithm.

15. The system of claim 14, wherein the cluster module provides, to a computing device, access to a service or a quality of service based on the computing device having a network address that is within the cluster.

\* \* \* \* \*